United States Patent
Birk et al.

(10) Patent No.: US 6,813,067 B1
(45) Date of Patent: Nov. 2, 2004

(54) METHOD AND APPARATUS FOR PROVIDING A BROADBAND RAMAN AMPLIFIER WITH IMPROVED NOISE PERFORMANCE

(75) Inventors: Martin Birk, Belford, NJ (US); Xiang Zhou, Middletown, NJ (US)

(73) Assignee: AT&T Corp., New York, NY (US)

( * ) Notice: Subject to any disclaimer, the term of this patent is extended or adjusted under 35 U.S.C. 154(b) by 38 days.

(21) Appl. No.: 10/288,131

(22) Filed: Nov. 5, 2002

(51) Int. Cl.[7] .................................................. H01S 3/00
(52) U.S. Cl. ...................................... 359/334; 359/341.3
(58) Field of Search ............................... 359/334, 341.3

(56) References Cited

U.S. PATENT DOCUMENTS

| | | | |
|---|---|---|---|
| 5,917,969 A | 6/1999 | Gavrilovic et al. | |
| 6,163,636 A | 12/2000 | Stentz et al. | |
| 6,191,877 B1 | 2/2001 | Chraplyvy et al. | |
| 6,205,268 B1 | 3/2001 | Chraplyvy et al. | |
| 6,373,621 B1 | 4/2002 | Large et al. | |
| 6,611,368 B1 * | 8/2003 | Grant et al. | 359/334 |
| 6,624,926 B1 * | 9/2003 | Hayashi et al. | 359/334 |

* cited by examiner

Primary Examiner—Mark Hellner

(57) ABSTRACT

A method and apparatus is presented which reduces noise degradation in the shorter wavelength band by using modulation of one/multiple pumps plus multiple-order Raman amplification. Such a scheme is very suitable for the case of SSMF fiber where pump-pump induced four-wave mixing (FWM) effects are negligible. Further, a group Time Domain Multiplexing (TDM) configuration is provided to simultaneously reduce the amplified spontaneous emission (ASE) noise and pump-pump induced FWM effects for the case of NZ-DSF fiber.

23 Claims, 12 Drawing Sheets

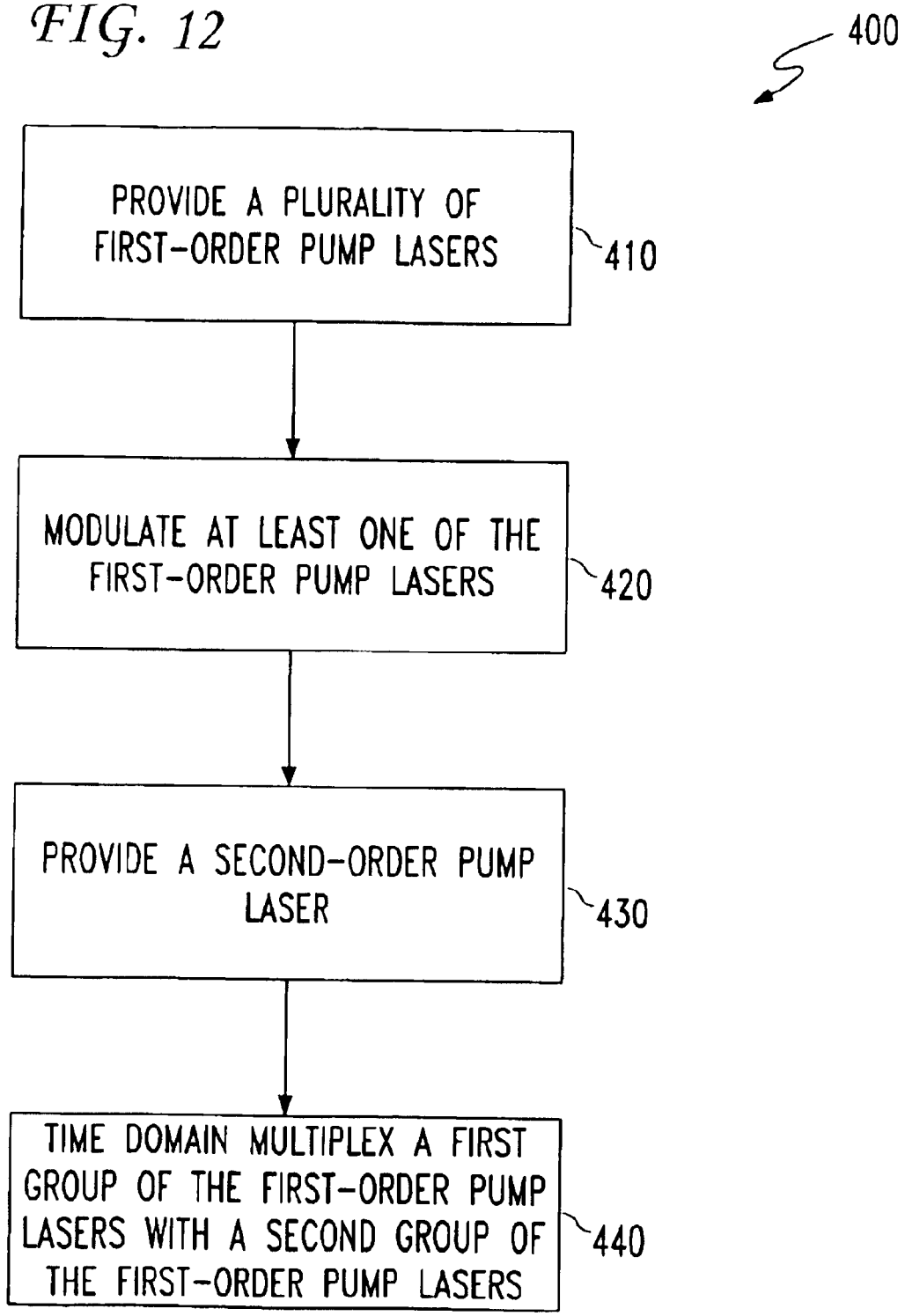

METHOD AND APPARATUS FOR PROVIDING A BROADBAND RAMAN AMPLIFIER WITH IMPROVED NOISE PERFORMANCE

CROSS-REFERENCE TO RELATED APPLICATIONS

Not Applicable

STATEMENT REGARDING FEDERALLY SPONSORED RESEARCH

Not Applicable

1. Field of the Invention

The present invention relates generally to broadband amplifiers and, more specifically, to broadband Raman amplifiers for use in long-haul and ultralong-haul transmission systems.

2. Background of the Invention

Distributed Raman Amplification (DRA) is known by those of ordinary skill in the art. DRA is a powerful technique to improve the optical signal to noise ratio (OSNR) margin in a transmission optical fiber of long-haul Wavelength Division Multiplexing (WDM) systems, for example. The principle of the Raman amplifier is based on the stimulated emission process associated with Raman scattering in fiber for amplification of the signal. In quantum mechanics, Raman scattering is a process in which an incident photon excites an electron to a virtual state and then the stimulated/spontaneous emission occurs when the electron de-excites down to the upper photon energy level of the glass molecule of the optical fiber. In amorphous materials such as fused silica, molecular vibrational frequencies spread into bands that overlap and create a continuum. As a result, the Raman gain spectrum extends over a relatively large frequency range that is offset from the pump light frequency (up to 40 THz) with a broad peak located near 13.2 THz. Optical fibers can act as a broadband amplifier because of this feature.

A Raman pump is included as part of an amplifier and injects light into the fiber in the opposite direction of the source signal. The injected photons boost the optical signal where it is most needed—at the far end of the fiber where the signal is experiencing the most attenuation.

Referring now to FIG. 1, the energy levels and transitions associated with stimulated and spontaneous Raman emissions are shown. Generally, the available flat gain bandwidth for a single pump is about 15 nanometers (nm). To realize ultra-broadband (e.g., greater than about 75 nm, covering both C-band and L-band) amplification, pump lights (also referred to as pump lasers) with multiple wavelengths (typically greater than four) are necessary. In addition, to reduce the crosstalk caused by both pump power fluctuation and signal-induced pump depletion, it is advantageous to make the pump lights counter-propagating with the signals. In a multi-wavelength counter-pumped Raman fiber amplifier, it has been found that the noise performance in the shorter wavelength band is significantly worse than the noise performance in the longer wavelength band. This is due to temperature-dependent spontaneous Raman emission, the proximity of the signal to the pumps and rapid energy transfer of shorter-wavelength pumps to the longest-wavelength pump.

To flatten the noise performance in a multiple-wavelength pumped Raman fiber amplifier, a bidirectional-pumping scheme using specially designed pump lasers with very low relative intensity noise is used. A nearly 2 dB noise figure (NF) improvement was obtained in the shorter wavelength, band by use of this scheme. For such a scheme, however, the crosstalk originating from signal-induced co-propagating pump depletions is still serious and is difficult to overcome.

The origin of noise degradation in broadband signal transmission systems will now be described. A counter-pumped Raman fiber amplifier includes M pumps ($P_1, \ldots, P_M$). The set of propagation equations governing forward signal light power evolution considering temperature-dependent spontaneous Raman emission is given by Equation 1 below:

$$\frac{dS_n(z)}{dz} = B_n(z)S_n(z) + C_n(z) - \alpha_n S_n(z) \quad (1)$$

$$B_n(z) = \sum_{j=1}^{M} \frac{g_{nj}}{2A_{eff}} P_j(z)$$

$$C_n(z) = \sum_{j=1}^{M} \frac{g_{nj}}{2A_{eff}} \left[ h v_n \Delta v \left( 1 + \frac{1}{e^{h(\zeta_j - v_n)/\kappa T} - 1} \right) \right] P_j(z)$$

where $\alpha_n$ denotes the fiber loss at signal light frequency $v_n$, $\zeta_j$ denotes the frequency of the jth pump light, $S_n$ denotes the $n^{th}$ input signal and Z denotes fiber length. The subscript n denotes the $n^{th}$ signal, and $g_{nj}$ is the Raman gain coefficient. $A_{eff}$ is the fiber effective area. The term of $$1 + \frac{1}{e^{h(\zeta_j - v_n)/\kappa T} - 1}$$

denotes the temperature-dependent spontaneous Raman emission factors, where h is the Plank's constant, $\kappa$ is Boltzman's constant, T is the temperature in Kelvin, and $\Delta v$ is the noise bandwidth. In Equation 1, signal-signal Raman interaction and Rayleigh scattering have not been taken into account. The pump light power evolution has a similar equation as Equation 1. The signal gain $G_n(L)$ and noise power $\Theta_n(L)$ at the fiber output end corresponding to Equation 1 are given by $$G_n(L) = \exp\left\{-\alpha_n L + \int_0^L B_n(z) dz\right\} \quad (2)$$

$$\Theta_n(L) = \int_0^L C_n(z) \frac{G_n(L)}{G_n(z)} dz = \int_0^L C_n(z) G_n(z, L) dz$$

where $G_n(z,L)$ means signal gain obtained from z to L. From the above, it can be seen that the noise power is dependent on both the noise generation factor $C_n(z)$ and the longitudinal gain spectrum profile $G_n(z)$. $G_n(z)$ is assumed to be identical for various signal light frequencies. When the signal light frequency is closer to the pump light frequencies, i.e., the value of $\zeta_1 - v_n$ becomes smaller, the value of $C_n(z)$, and hence the noise power $\Theta_n(L)$, increases accordingly. This is due to the fact that the temperature-dependent spontaneous Raman emission factor, $$1 + \frac{1}{e^{h(\zeta_j - v_n)/\kappa T} - 1},$$

increases when $\zeta_j - v_n$ becomes smaller. For example, if T=300, while $\zeta_1 - v_n$=13.2 THz (corresponding to a peak Raman shift, a large frequency difference between the pump and the signal) and 1 THz (corresponding to a small frequency difference between the pump and the signal), the value of $$1 + \frac{1}{e^{h(\varsigma_l - v_n)/\kappa T} - 1}$$

becomes 1.125 and 5.55, respectively. This shows that the impact of temperature-dependent spontaneous Raman emission on signals in the shorter-wavelength side is much more serious than that in the longer-wavelength side.

The impact of the longitudinal gain spectrum profile $G_n(z)$ also should be considered. From Equation 2 it can be seen that, for the same value of $G_n(L)$, the value of $\Theta_n(L)$ increases when the gain seen by the signal is closer to the output end of the fiber. Physically, this is due to different mechanisms for noise generation and signal amplification. Noise is generated along the fiber length. Moreover, from Equation 1 it can be seen that the noise generation factor $C_n(z)$ has a linear relationship with the pump light power. However, the longitudinal gain spectrum profile $G_n(z)$ has an exponential relationship with the pump light power. This implies that the noise generation is more distributed along the fiber length than is, the signal gain. As a result, when the signal gain is closer to the output end of the fiber, most of the noise components generated along the fiber length will experience a relatively large gain and, hence, result in a worse noise performance; however, when the signal gain is farther away from the output end of the fiber, there are relatively fewer noise components that experience large gain and, hence, the result is enhanced noise performance.

FIGS. 2a–2c give a simulated example of a conventional five-wavelength counter-pumped fiber Raman amplifier. The powers and wavelengths of the five pumps used are: 1421 nm (520 mw), 1435 nm (400 mW), 1450 nm (190 mW), 1472 nm (58 mW) and 1501 nm (98 mW). The input signal power is chosen to be −15 dBm/channel and 80 km of Stranded Single-Mode Fibers (SSMF) is used in the simulations. The fiber loss curve 5 is shown in FIG. 3. The fiber effective area is approximately 80 $\mu m^2$.

FIGS. 2b–2c show the calculated pump light power evolutions along the fiber length and individual on/off Raman gain given by the five pump lights, respectively. The on/off Raman gain is defined as the ratio of the output signal light power with Raman pumping and without Raman pumping. From these two figures, it can be seen that the longest-wavelength pump (1501 nm) gives much greater gain than any other pumps. It not only gives most of the gain to the longer-wavelength signals, it also gives considerable gain (comparable to that contributed by the shortest-wavelength pump) to the shorter-wavelength signals. From FIG. 2b, it can also be found that the energy of the longest-wavelength pump can go much farther away from the fiber end than that of the shorter-wavelength pump (due to pump-pump interaction). Thus, the shorter-wavelength signals will see part of the gain from the shorter-wavelength pump, which is closer to the end of the fiber, and part of the gain from the longer-wavelength pump, which is more distributed along the fiber length. The longer-wavelength signals will see most of the gain from the longest-wavelength pump.

As discussed above, the noise originating from spontaneous Raman emission will increase when signal light frequency is closer to the pump light frequency under identical signal gain (refer to Equations 1 and 2), and a lumped gain closer to the fiber end will result in a worse noise performance than a distributed gain along the fiber length (refer to Equation 2). Accordingly, the noise performance in the shorter wavelength band is worse than that in the longer wavelength band, as is shown in FIG. 2a where the calculated gain (line 2), effective noise figure (NF) (line 1) and optical signal to noise ratio (OSNR) (line 3) for the above mentioned five-wavelength counter-pumped Raman fiber amplifier are shown. The effective NF, which is defined as the noise figure of the equivalent discrete amplifier, is given by $$NF_{eff} = \frac{1}{G_{on/off}}\left(1 + \frac{P_{ASE}}{E_{ph}B_0}\right) \qquad (3)$$

where $G_{on/off}$ is the on/off Raman gain, $E_{ph}$ is the signal photon energy and $P_{ASE}$ is the noise power in a bandwidth $B_O$. From the dashed line 1 in FIG. 2a it can be seen that the effective NF in the shorter wavelength band (1520 nm) can be more than 7 dB higher than that in the longer wavelength band (1610 nm). Because the attenuation curve of the fiber is not flat over 1520 nm to 1610 nm, to get a flat gain spectrum, the on/off Raman gain over this frequency range can be quite different for a span of 80 km Standard Single-Mode Fiber (SSMF) fiber. For example, the fiber loss at 1550 nm can be a little lower than 16 dB, but can be a little higher than 20 dB at 1610 nm. To obtain a flat gain spectrum, e.g., 0 dB, the on/off Raman gain needs to be 20 dB for a 1610 nm signal but only 16 dB for a 1550 nm signal. From Equation 3 it can be seen that, for a flat gain spectrum, the effective NF at 1610 nm can be 4 dB lower than that at 1550 nm even in the case that the OSNRs (i.e., the noise performance) at the two wavelengths are nearly identical. It is then clear that effective NF cannot be used as the measure of the noise performance over a large wavelength range as long as the fiber loss curve is not flat over this wavelength range. As a result, it is necessary to directly use the output OSNR (the input signal power should be identical for all the signal wavelengths) as the measure of noise performance in system design. The dotted line 3 in FIG. 2a gives the calculated output OSNR as a function of the signal wavelength. It can be observed that the output OSNR in the shorter-wavelength band can be nearly 3.5 dB lower than that in the longer wavelength band.

Two patent applications aiming at reduction of pump-induced four-wave mixing (FWM) effects were published recently (EP 1130825, Sep. 5, 2001, and EP 1130705, Sep. 5, 2001). In EP 1130705, pump-pump induced FWM effects are reduced at the expense of gain flatness by reducing the number of the pump lights used and shifting the FWM products to either the idle band between C-band and L-band or simply to the lower side of the signal bands. EP 1130825, deals with the pump-noise induced FWM effect (such an effect occurs when the zero dispersion frequency of the transmission fiber is centered between the pump frequency and a signal frequency experiencing a large Raman gain) but doesn't consider pump-pump induced FWM effects.

It would, therefore, be desirable to provide a method and apparatus for improving the noise performance of signals in long-haul and ultralong-haul transmission systems.

SUMMARY OF THE INVENTION

The present invention provides a method and apparatus that address the issue of noise degradation in the shorter wavelength band based on a counter-pumped configuration by using modulation of one/multiple pumps plus multiple-order Raman amplification. Such a scheme is very suitable for the case of SSMF fiber where pump-pump induced four-wave mixing (FWM) effects are negligible. In another embodiment, a group Time Domain Multiplexing (TDM) scheme is provided to simultaneously reduce the amplified spontaneous emission (ASE) noise and pump-pump induced FWM effects for the case of Non-Zero Dispersion-Shifted Fiber (NZ-DSF).

BRIEF DESCRIPTION THE DRAWINGS

The invention will be more fully understood from the following detailed description taken in conjunction with the accompanying drawings, in which:

FIG. 4b is a diagram showing the energy transfer among the pumps of the amplifier of FIG. 4a;

FIG. 12 is a flow chart of the presently disclosed method.

DETAILED DESCRIPTION OF THE INVENTION

Figure 4A:
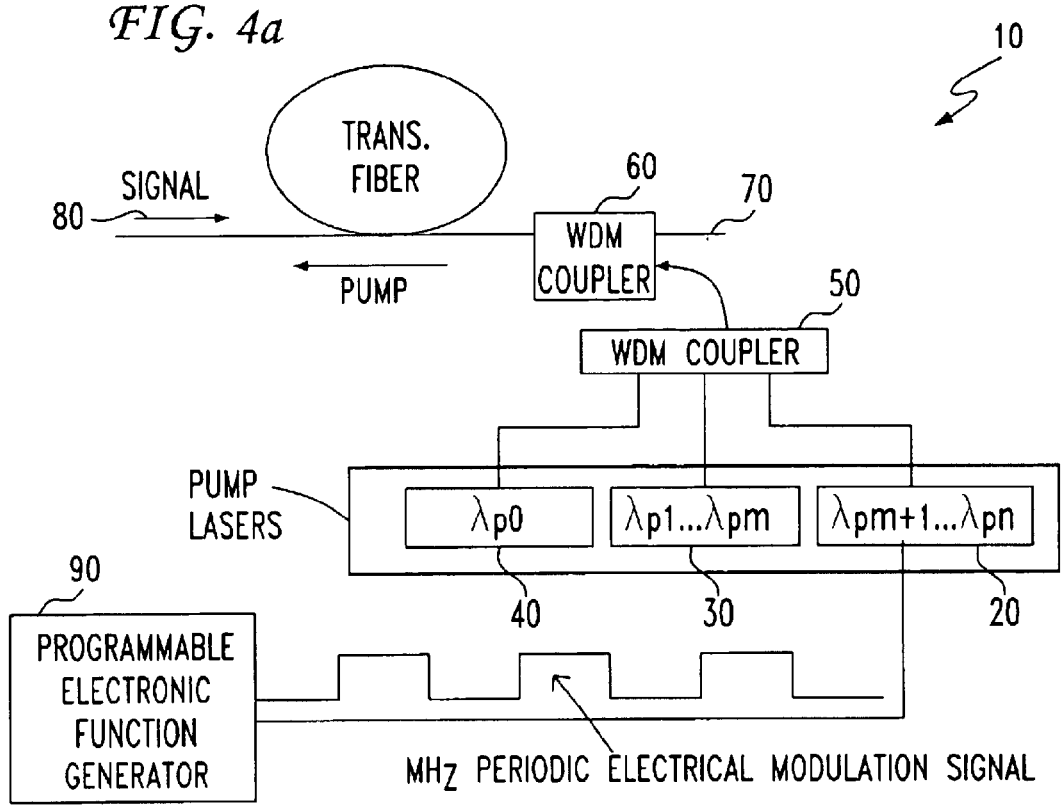
FIG. 4a is a diagram of the Raman amplifier of the present invention.

Referring now to FIG. 4, the broadband Raman amplifier 10 of the present invention is shown. The amplifier 10 includes multiple pumps 20, 30, 40 and a modulator 90 which modulates one or more of the pumps. The outputs of the pumps are multiplexed by WDM coupler 50, and the output of the WDM coupler 50 is multiplexed through a second WDM coupler 60 onto an optical fiber 70. Fiber 70 also has a signal 80 being transported down the fiber.

The amplifier 10 includes n pumps 30 (the first-order) with lights having wavelengths of $\lambda_{p1}, \lambda_{p2} \ldots$, and $\lambda_{pn}$ ($\lambda_{p1} < \lambda_{p2} \ldots < \lambda_{pn}$), which are utilized to provide the required flat gain spectrum. A periodic intensity modulation is imposed on the longer-wavelength pumps 20, for example, $\lambda_{pm+1} \ldots \lambda_{pn}$. The longer wavelength pumps 20 are modulated by the programmable function generator (modulator) 90. The modulation frequency should be high enough to ensure that the signals will see a large number of pump pulses along the fiber length and also cannot be so high that the pulse period becomes comparable to the walk-off length between the modulated longest-wavelength pump and the shortest-wavelength pump. The modulation frequency $f_M$ (Hz) (or modulation period $T_M$) should satisfy the relationship:

$$\frac{1}{f_M} = T_M << \frac{L}{c_n} \quad (4)$$

$$\frac{1}{f_M} = T_M >> \left(\frac{D_L + D_S}{2}\right) \cdot L \cdot (\lambda_{pn} - \lambda_{pl}) \cdot 10^{-12}$$

where L (km) denotes the fiber length, $D_L$ (ps/nm.km) denotes the fiber dispersion at the longest wavelength $\lambda_{pn}$, $D_s$ denotes the fiber dispersion at the shortest wavelength $\lambda_{p1}$, and $c_n$ denotes the group velocity of the light (at wavelength of $(\lambda_{p1} + \lambda_{pn})/2$) in the fiber. For an 80 km span of SSMF fiber with pump wavelength span less than 100 nm (1410–1510 nm), the required modulation frequency falls in the range:

$$2.5 \text{ KHz} << f_M << 9.6 \text{ MHz} \quad (5)$$

where $D_L$=15 (ps/nm.km) and $D_S$=11 (ps/nm.km).

The shorter-wavelength pumps 30, $\lambda_{p1} \ldots \lambda_{pm}$, are still in the continuous-wave (CW) form, so only a part of the shorter-wavelength and the longer-wavelength pumps overlap in time domain. When the duty cycle (denoted as $\eta$ hereafter) of the periodic pulse of the longer-wavelength pumps is 0.5, then only half of the energy of the shorter-wavelength pumps 30, $\lambda_{p1} \ldots \lambda_{pm}$, can be rapidly transferred to the longer-wavelength pumps 20, $\lambda_{pm+1} \ldots \lambda_{pn}$. The remaining half of the energy of the shorter-wavelength pumps can go farther along the fiber length since they will not be depleted by pumping these longer-wavelength pumps. This implies that the gain given by the shorter-wavelength pumps mainly in the shorter-wavelength signal band will be more distributed than the case without pump modulation. Moreover, the relatively large noise components generated by the longer-wavelength pumps in the shorter-wavelength signal band will be less amplified by these shorter-wavelength pumps (see Equation 2). Therefore the noise performance in the shorter-wavelength signal band is improved. Because these longer-wavelength pumps are modulated to maintain the same gain spectrum profile as that without pump modulation, they need larger peak powers. As a result, more rapid energy transfers occur between these shorter-wavelength pumps and longer-wavelength pumps. The signals in the longer-wavelength band will see a larger gain close to the fiber end compared with that without pump modulation. This results in a decreased noise performance in the longer-wavelength band (refer to Equation 2). However, this effect is acceptable because the noise performance in the longer-wavelength signal band is still expected to be better than that in the shorter-wavelength signal band. Moreover, by incorporating multiple-order pumping, the noise performance of the shorter-wavelength signals is improved with negligible noise performance degradation for the longer wavelength signals.

Figure 5A:
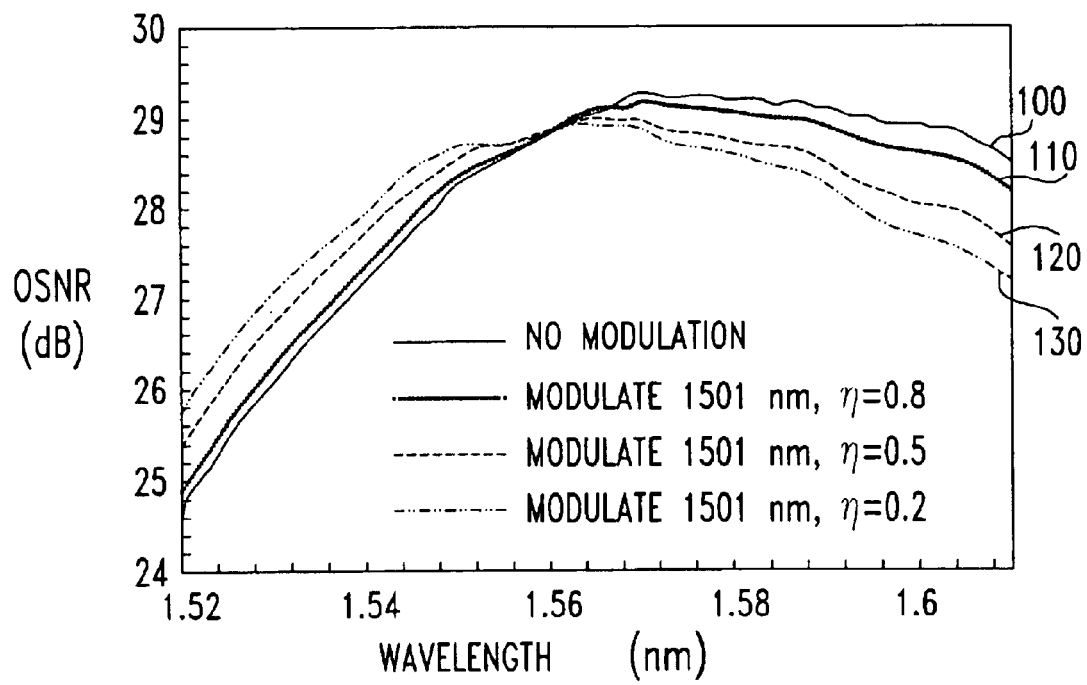
FIG. 5a is a graph OSNR for different pump modulations.
Figure 5B:
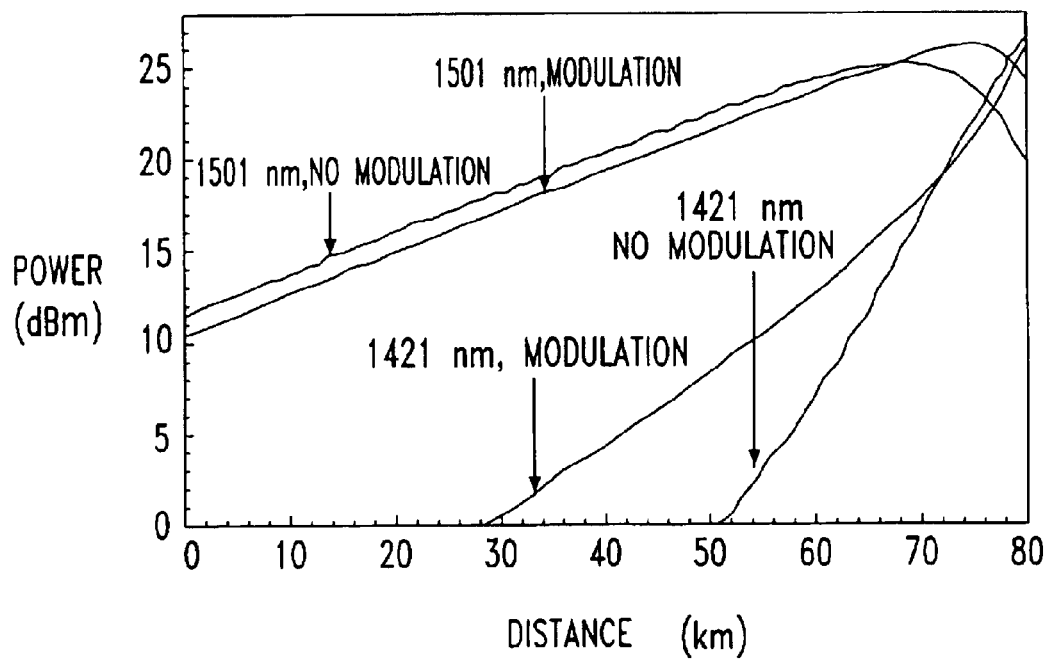
FIG. 5b is a diagram showing power evolutions along a fiber with different pumps and modulations.

Referring now to FIGS. 5a–5b, a simulated example of a five-wavelength counter-pumped fiber Raman amplifier with only one-pump modulation is shown. In this simulation, the fiber length was divided into a number of segments. Within each segment, the signal gain was obtained in such a manner that the signal just sees a time-averaged pump power for each pump because they are counter-propagating against each other. For pump-pump Raman interaction, the Raman gains are calculated based on peak pump powers because they are co-propagating along the fiber length. In addition, $f_M$ is low enough that the walk-off length between the longest-wavelength pump and the shortest-wavelength pump is negligible compared with modulation period $T_M$.

Eighty km of SSMF fiber was used in the simulation. The pump wavelengths, input signal power per channel, fiber effective area, Raman gain coefficients and fiber attenuation curve were chosen to be the same as that used in the simulation of FIG. 2. For various pump configurations—for example, with pump modulation or without pump modulation—the principle for pump power allocation is: ensure that the obtained gain spectrum is (nearly) identical with that in FIG. 2a (solid line 2). Unless specially noted, the above fiber parameters, input signal power per channel, pump wavelengths, principle for pump power allocation and simulation method are used in all of the following simulations.

FIG. 5a gives a calculated output OSNR comparison for the case with no pump modulation (line 100), one-pump modulation (1501 nm) with duty cycle (denoted as $\eta$ hereafter) of 0.8 (line 110), one-pump modulation (1501 nm) with duty cycle 0.5 (line 120), and one-pump modulation (1501 nm) with duty cycle 0.2 (line 130). FIG. 5b gives the time-averaged pump power evolutions along the fiber length. In accordance with the analyses in the above, it can be seen that the shorter-wavelength-band noise performance is improved even by the introduction of only one-pump modulation. For $\eta$=0.8, 0.5 and 0.2, it can be observed that the corresponding output OSNR improvement in the shorter-wavelength signal band, for example, 1520 nm, can be 0.1 dB, 0.7 dB and 1.1 dB, respectively. The smaller $\eta$ is, the better the noise performance becomes (in the shorter-wavelength signal band). When $\eta$ becomes smaller, however, the energy received by the modulated pump light (i.e., the longest-wavelength pump) from the shorter-wavelength pumps will also become smaller. As a result, to obtain an identical gain spectrum to that shown in FIG. 2a, both the required peak power (defined as duration-averaged power hereafter) and time-averaged power of the modulated pump light will increase as $\eta$ decreases. Such a result is shown in Table 1, where the required peak power and average powers for various values of $\eta$ are shown.

TABLE 1

Input pump powers for various value of $\eta$ in the case of one-pump modulation in accordance with FIG. 5

| Wavelength (nm) | Power (mW) $\eta$ | | | |
|---|---|---|---|---|
| | $\eta$ = 1 | $\eta$ = 0.8 | $\eta$ = 0.5 | $\eta$ = 0.2 |
| 1501 peak power | 98 | 170 | 550 | 2400 |
| 1501 Average power | 98 | 136 | 275 | 480 |
| 1472 | 58 | 48 | 40 | 45 |
| 1450 | 190 | 195 | 180 | 130 |
| 1435 | 400 | 360 | 320 | 285 |
| 1421 | 520 | 530 | 440 | 305 |

TABLE 1-continued

Input pump powers for various value of $\eta$ in the case of one-pump modulation in accordance with FIG. 5

| Wavelength (nm) | Power (mW) $\eta$ | | | |
|---|---|---|---|---|
| | $\eta$ = 1 | $\eta$ = 0.8 | $\eta$ = 0.5 | $\eta$ = 0.2 |
| Total average power | 1166 | 1269 | 1255 | 1245 |

A trade-off exists between the pump power budget and the noise performance. The introduction of pump modulation itself may promote the diode pump laser's peak output power level and therefore partly alleviates the high requirement for pump power for a small value of $\eta$.

Figure 6:
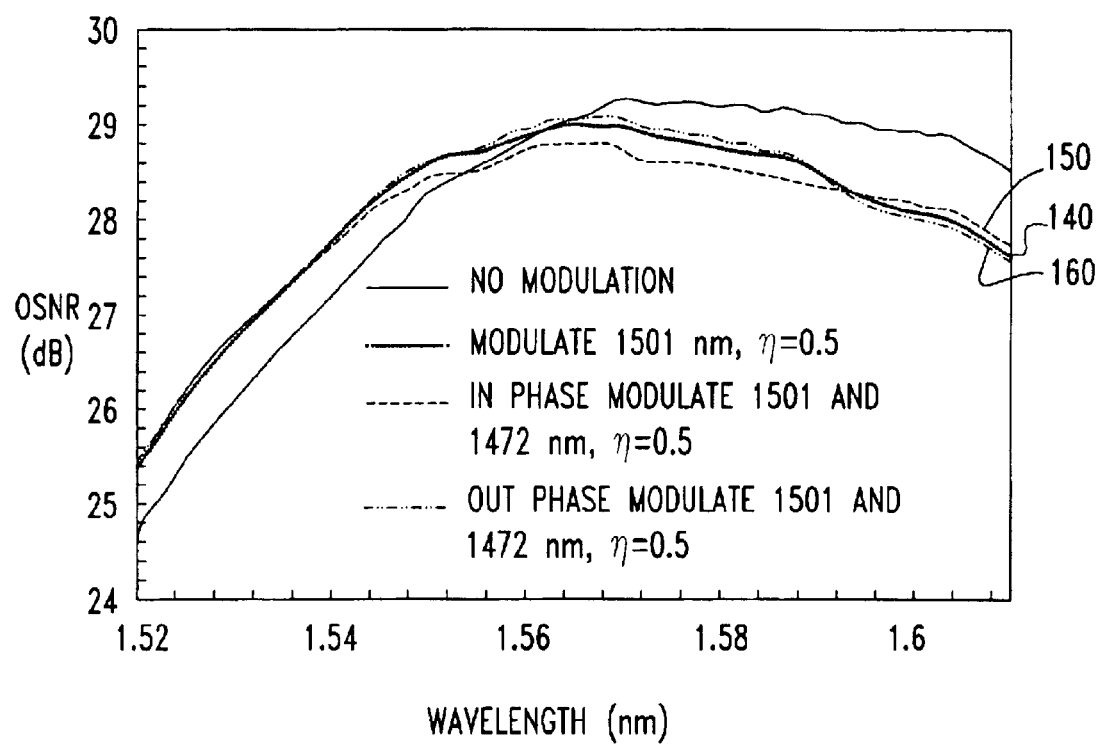
FIG. 6 is a graph showing OSNR for different modulation schemes.

FIG. 6 gives an output OSNR comparison for the cases of one-pump modulation (1501 nm, $\eta$=0.5) (line 140), in-phase (line 150) and out-of-phase (line 160) two-pump modulations (1472 and 1501 nm, $\eta$=0.5. the other three pumps are still conventional CW pumps). It can be observed that the three cases exhibit nearly identical noise performance in the shorter-wavelength signal band. This is due to the fact that the gain given by the fourth pump (1472 nm) in the shorter-wavelength signal band is relatively small (<1 dB). Simulations also show that when more than two pumps are modulated, no significant noise performance improvement is observed in the shorter-wavelength signal band. When pump power is a consideration, one-pump modulation may provide an optimal choice.

Figure 4B:
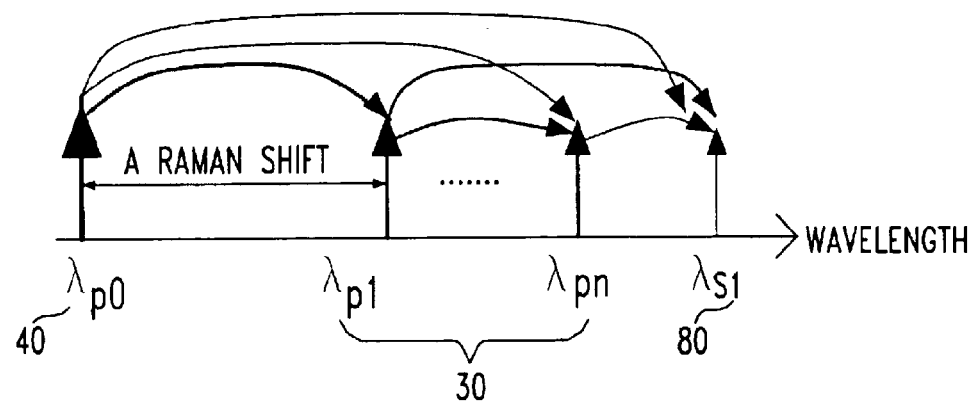

In order to further improve the noise performance, multiple-order pumping is used. The concept of multiple-order pumping is well known (for example, see U.S. Pat. No. 6,163,636). In FIG. 4b a schematic illustration of energy transfer in a two-order pumping Raman amplifier is shown. Lights $\lambda_{p1}$ to $\lambda_{pn}$ 30 are the required first-order Raman pumps in order to obtain the required Raman gain spectrum. Light $\lambda_{p0}$ 40, a Raman shift from light $\lambda_{p1}$ is the second-order pump. Light $\lambda_{s1}$ 80 means the signal at the shortest wavelength. The reason that multiple-order pumping can reduce noise is due to the fact that the peak Raman gains seen by the signals can be moved farther away from the end of the fiber (as shown in FIG. 7b).

Figure 7A:
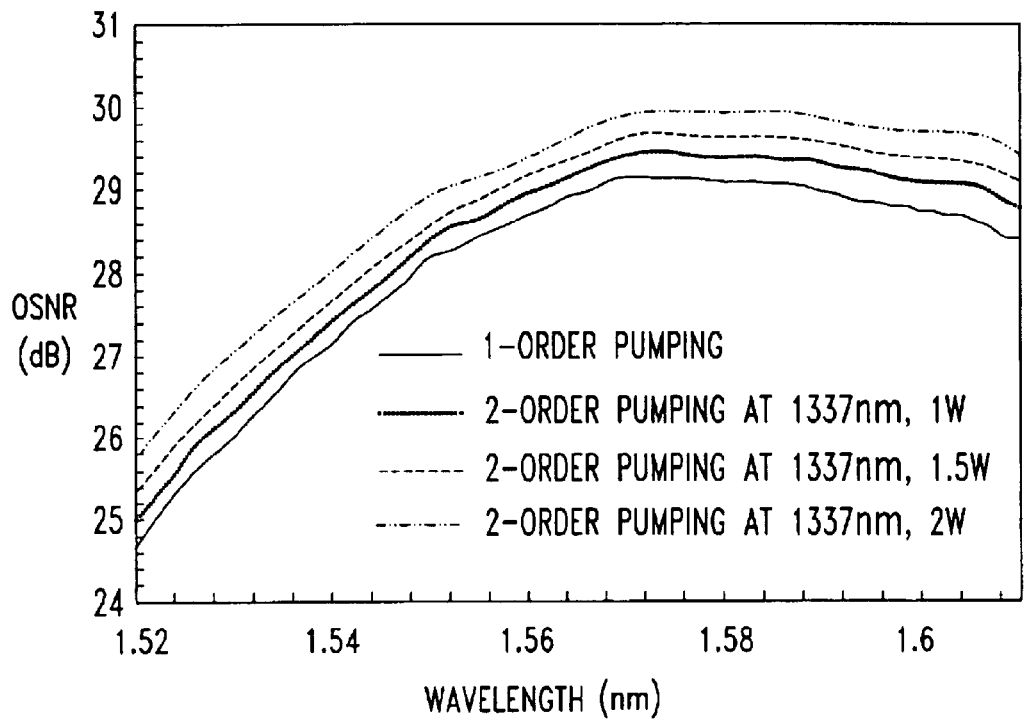
FIG. 7a is a graph showing OSNR for one-order pumping and two-order pumping.
Figure 7B:
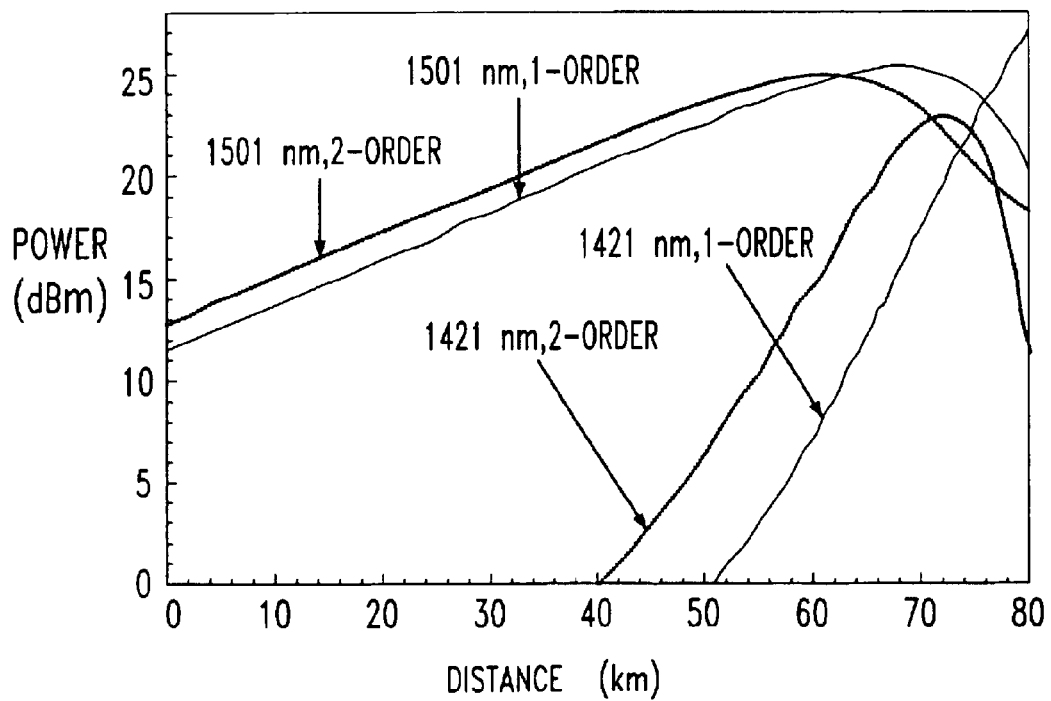
FIG. 7b is a graph showing pump power along the fiber length.

In FIGS. 7a–7b, a simulated example of two-order pumping fiber Raman amplifier is provided. In this simulation, the first-order pumping wavelengths are the same as that in FIG. 2 and the second-order pumping wavelength is chosen to be a Raman shift from the shortest wavelength of the first-order pumps. FIG. 7a gives the output OSNR comparison for purely one-order pumping and two-order pumping. From FIGS. 7a–7b, it can be seen that the noise performance improvement is quite dependent on the power of the second-order pump: the greater the power of the second-order pump, the better the noise performance becomes. It can be further seen that the noise performance improvement is almost identical over the signal wavelength span. This suggests that modulation of first-order pumps and multiple-order Raman amplification can be incorporated in one system.

Figure 8:
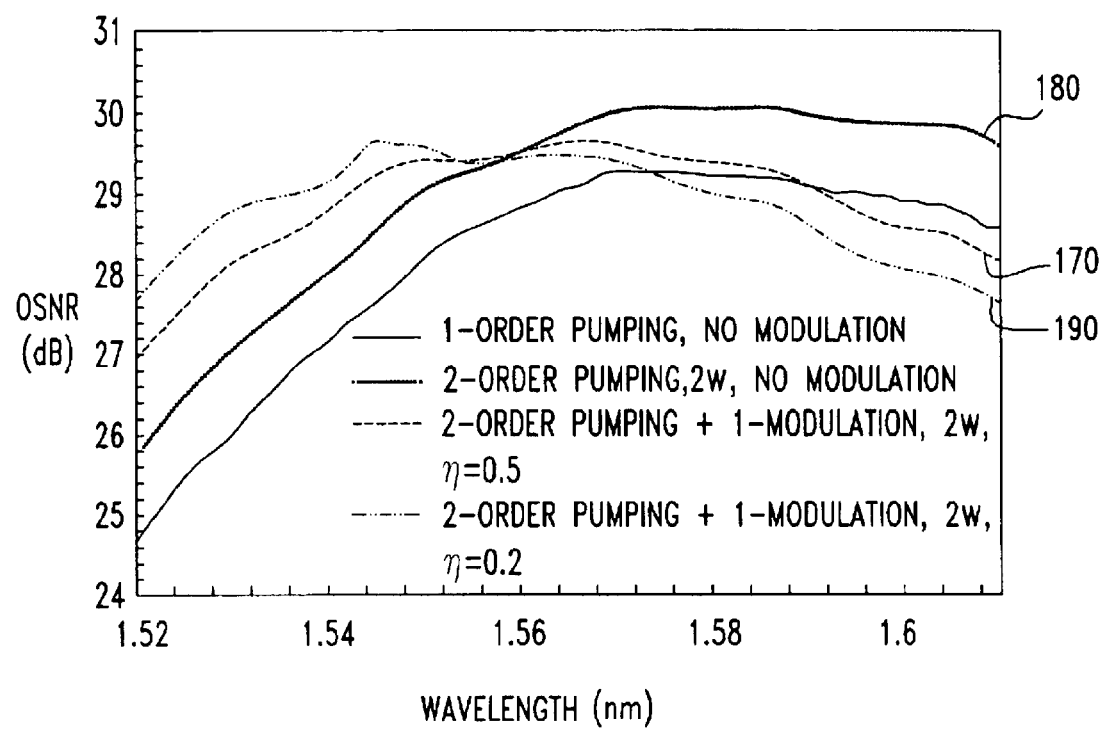
FIG. 8 is a graph of OSNR for various pumping arrangements at a first power level.
Figure 9A:
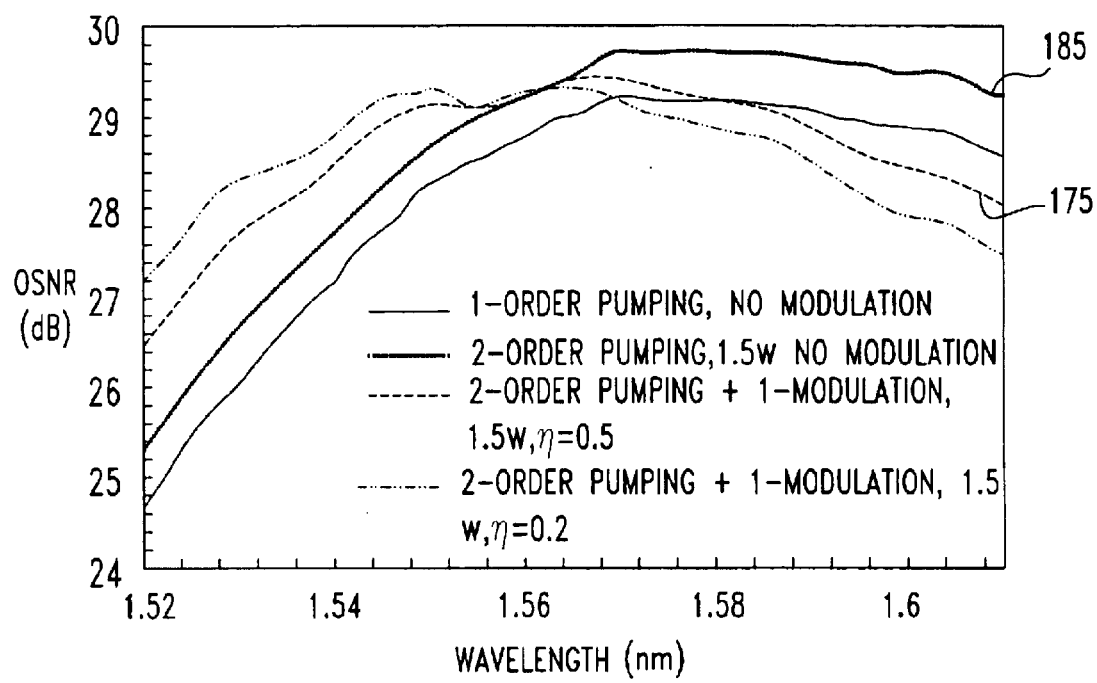
FIG. 9a is a graph of OSNR for various pumping arrangements at a second power level.
Figure 9B:
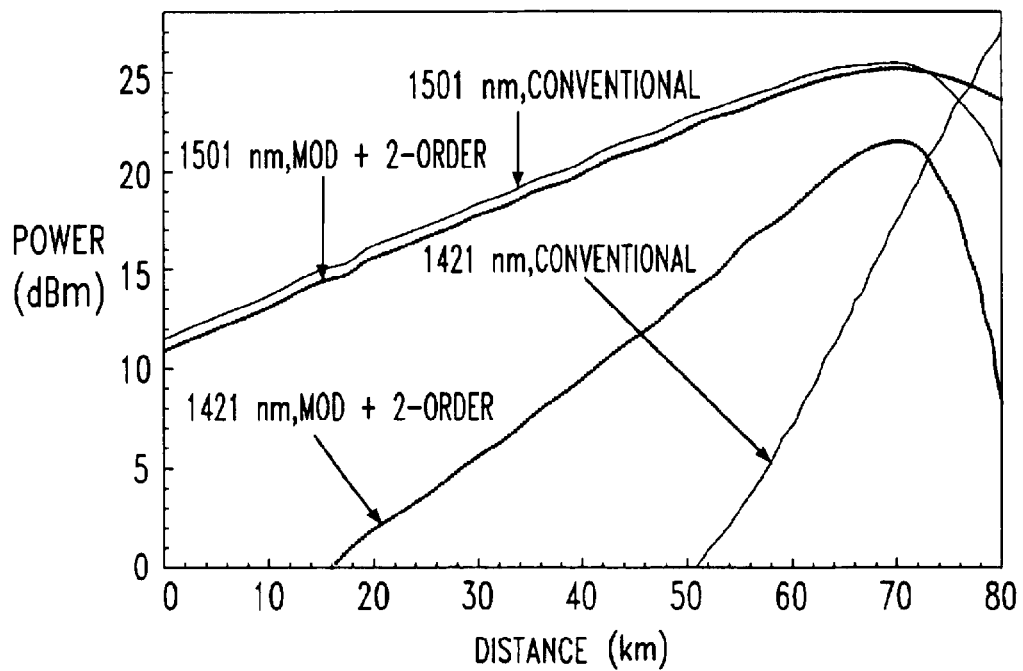
FIG. 9b is a graph showing power along fiber length.

FIG. 8 and FIGS. 9a–9b give a simulated example of a fiber Raman amplifier with one-pump modulation (1501 nm) plus two-order Raman amplification. In FIG. 8 and FIG. 9, the CW power of the second-order pump (denoted as P2 hereafter) is chosen to be 2 W and 1.5 W, respectively. Considering the wide Raman pump linewidth (0.5–2 nm), stimulated Brillouin scattering (SBS) is negligible even for pump power of over 2 W in the SSMF fiber. From FIG. 8 and FIG. 9a, it can be seen that, in the case of η=0.5, for P2=2 W (line 170) and 1.5 W (line 175), the output OSNR can be improved by about 2.3 dB and 1.7 dB (in the shorter-wavelength band, 1520 nm), respectively, while the noise degradation in the longer-wavelength band, typically 1610 nm, is observed to be 0.3 and 0.4 dB, respectively. However, in the case of purely two-order pumping, for P2=2 W (line 180) and 1.5 W (line 185), the OSNR improvement is only 1.1 and 0.6 dB (in the shorter-wavelength band, 1520 nm), respectively. It can be seen that more than 1.1 dB of additional noise performance improvement is obtained by introducing one-pump modulation compared with purely two-order pumping. Especially, it can be observed that, if η=0.2 and P2=2 W (line 190), nearly 3 dB OSNR improvement is obtained in the shorter-wavelength band (1520 nm) with only 0.6 dB degradation in the longest-wavelength signal (the longest-wavelength signal and the shortest-wavelength signal have nearly identical noise performance). This corresponds to nearly 2 dB of additional noise performance improvement compared with purely two-order pumping scheme. As discussed above and as shown in Table 2, a small value of η requires a relatively large pump power. Note that the diode pump laser is strongly temperature dependent: a lower junction temperature corresponds to a lower threshold and a higher output power. The introduction of pump modulation is helpful to reduce heat dissipation and therefore it is expected that the peak output power of a periodic intensity-modulated diode pump laser can be higher than its continuous wave (CW) output.

TABLE 2

Input pump powers for various pump arrangements in the cases of modulation of one pump plus two-order Raman amplification in accordance with FIG. 8

| Wavelength (nm) | Power (mW) η | | |
|---|---|---|---|
|  | η = 1 | η = 0.5 | η = 0.2 |
| 1501 Peak power | 71 | 450 | 1800 |
| 1501 Average power | 71 | 225 | 360 |
| 1472 | 42 | 35 | 33 |
| 1450 | 50 | 45 | 25 |
| 1435 | 35 | 18 | 6 |
| 1421 | 10 | 5 | 0.6 |
| 1337 | 2000 | 2000 | 2000 |
| Total average power | 2208 | 2328 | 2424.6 |

The above discussions reveal that the noise performance in the shorter-wavelength band can be improved by lengthening the effective gain length of the shorter-wavelength pumps. As a natural extension of modulation of multiple pumps, it can be supposed that the noise performance improvement can be obtained when the longer-wavelength pumps and the shorter-wavelength pump are transmitted in different time slots. For example, if all the pump lights are divided into two groups, the first group contains the shorter-wavelength pump lights and the second group contains the other, longer-wavelength pump lights. The two groups of pump lights are transmitted alternately in the time domain. For convenience, this scheme is referred to as "group TDM" hereafter, because each time slot can transmit a group of pump lights with different wavelengths.

Figure 10A:
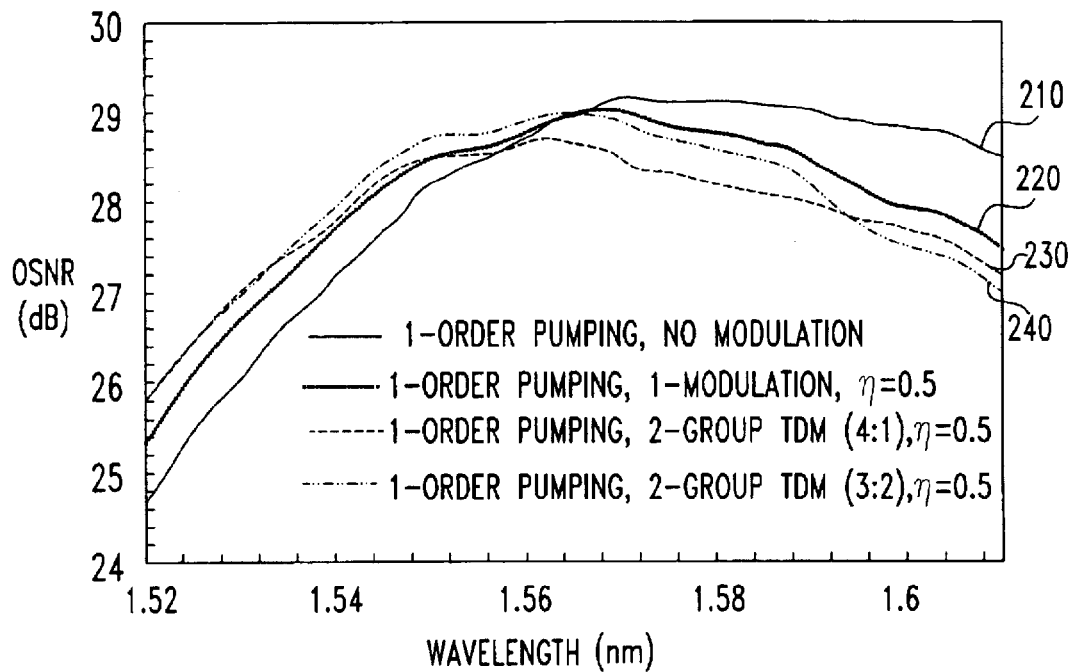
FIG. 10a is a graph showing OSNR for different pumping schemes.
Figure 10B:
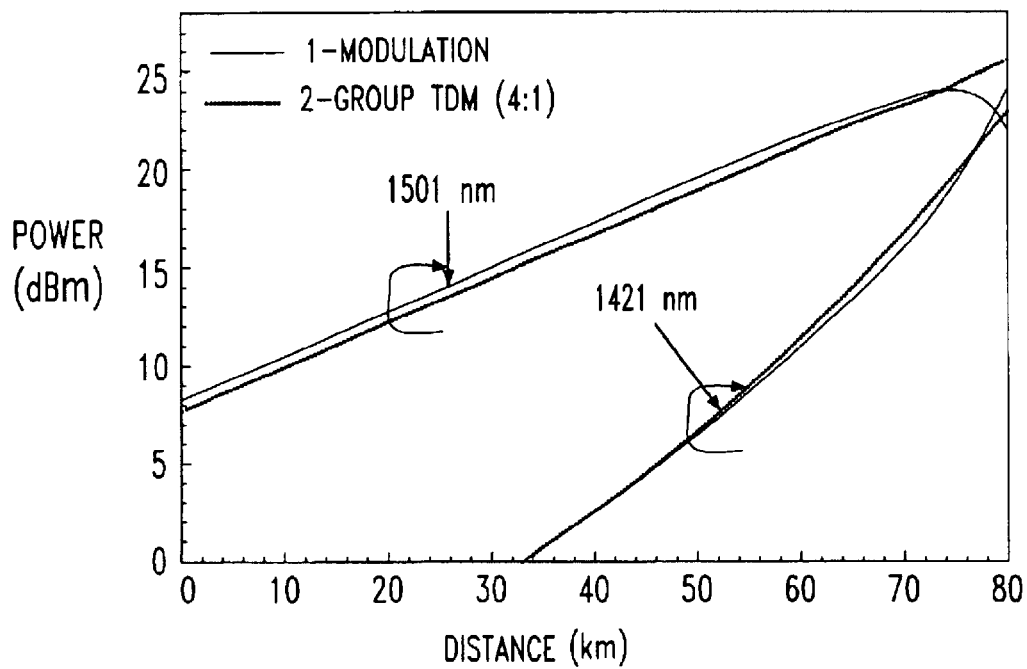
FIG. 10b is a graph showing pump power along the length of a fiber for different pumping schemes.

FIGS. 10a–10b give a simulated example of purely two-group TDM scheme. FIG. 10a gives an output OSNR comparison for a conventional one-order pumping scheme (line 210), one-order pumping with either one-pump modulation (line 220) or a two-group TDM scheme (line 230 and line 240). The dashed line 230 denotes the case in which the first group contains four pump wavelengths (1421 nm, 1435 nm, 1450 nm and 1472 nm) and the dot-dashed line 240 denotes the case in which the first group contains three pump wavelengths (1421 nm, 1435 nm and 1450 nm). The symbol 4:1 denotes the case in which the first group contains four pumps with shorter wavelengths and the second group contains the other one pump with longer wavelength. The symbol 3:2 has a similar meaning. For the two group TDM scheme, η means the normalized time slot width occupied by the first group. Eighty km of Non-Zero Dispersion-Shifted Fiber (NZ-DSF) fiber with an effective area of 50 $\mu m^2$ was used in the simulations. FIG. 10b gives the time-averaged pump power evolution along the fiber length in accordance with FIG. 10a. The purely two-group TDM scheme exhibits a better noise performance in the shorter-wavelength band than purely one-pump modulation. This is because the group TDM scheme can completely remove the direct energy transfer between the shortest-wavelength pump and the longest-wavelength pump.

Figure 11A:
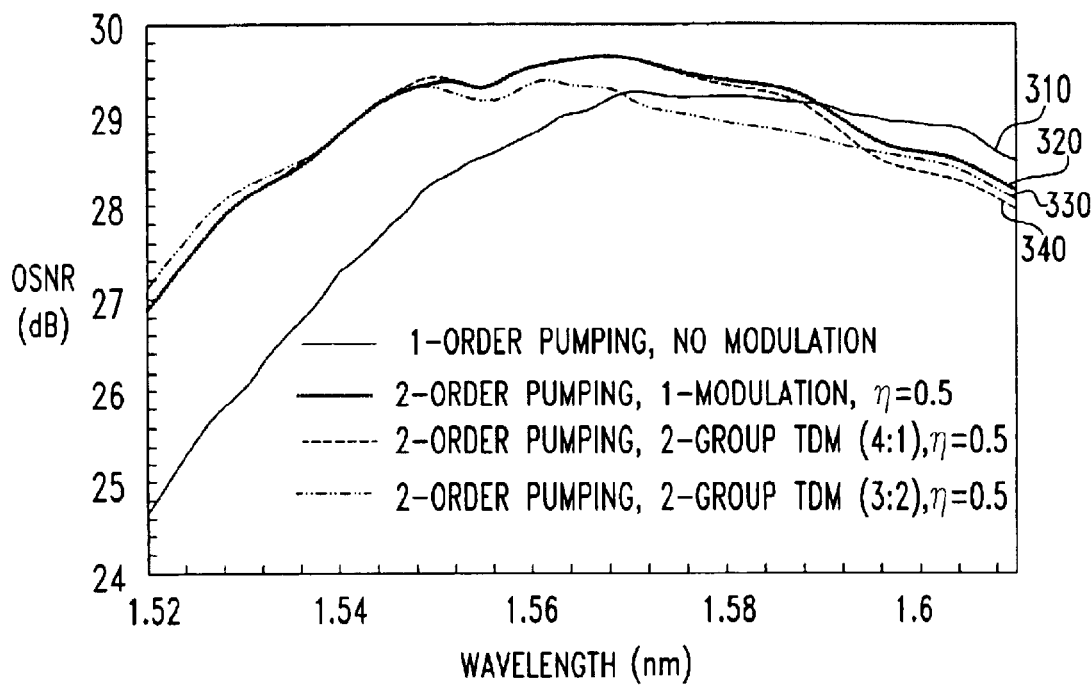
FIG. 11a is a graph showing OSNR for a variety of pump arrangements.
Figure 11B:
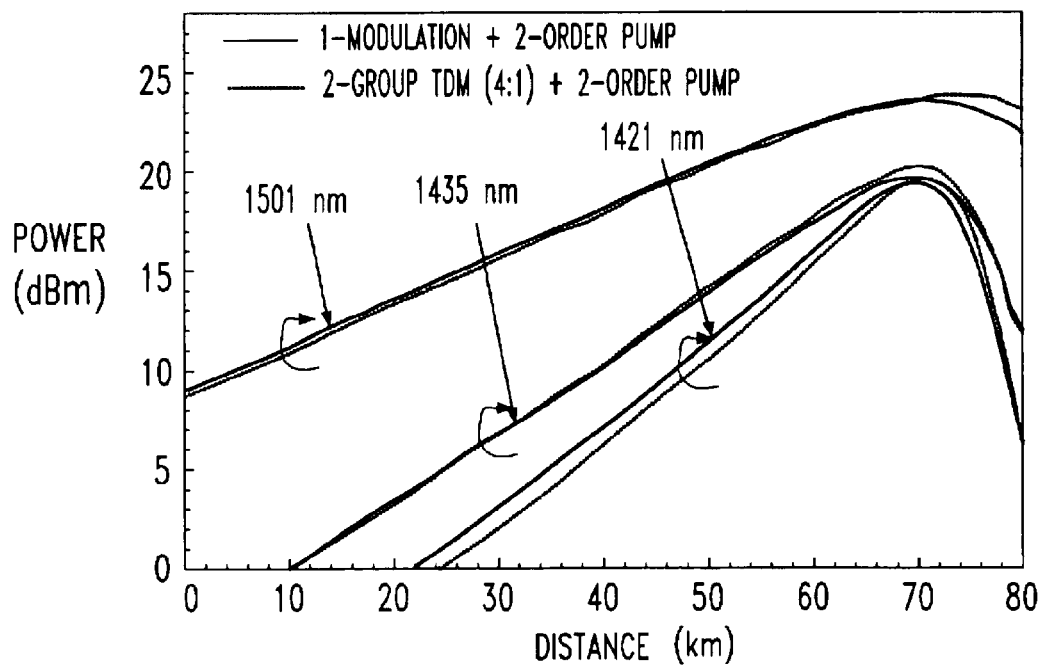
FIG. 11b is a graph showing pump power along the length of a fiber for a variety of pumping arrangements.

FIGS. 11a–11b give the simulated results for the cases of two-group TDM scheme plus two-order Raman amplification. FIG. 11a gives an output OSNR comparison for conventional one-order pumping scheme (solid line 310), one-pump modulation plus two-order Raman amplification (dotted line 320) and two-group TDM scheme plus two-order Raman amplification (dashed line 330 and dot-dashed line 340). For both the one-pump modulation scheme and the two-group TDM scheme, η is chosen to be 0.5. The second-order pump wavelength lies at 1337 nm with a power of 1.2 W. Eighty km of NZ-DSF fiber with an effective area of 50 $\mu m^2$ was used in the simulations. FIG. 11b gives the time-averaged pump power evolution along the fiber length in accordance with FIG. 11a. From FIG. 11a it can be observed that the two schemes, two-group TDM plus two-order Raman amplification and one-pump modulation plus two-order Raman amplification, have nearly identical noise performance in the shorter-wavelength band. Moreover, modulation of one pump plus two-order Raman amplification has better noise performance than the scheme of two-group TDM plus two-order Raman amplification in the longer-wavelength band. This can be explained as follows.

Figure 1:
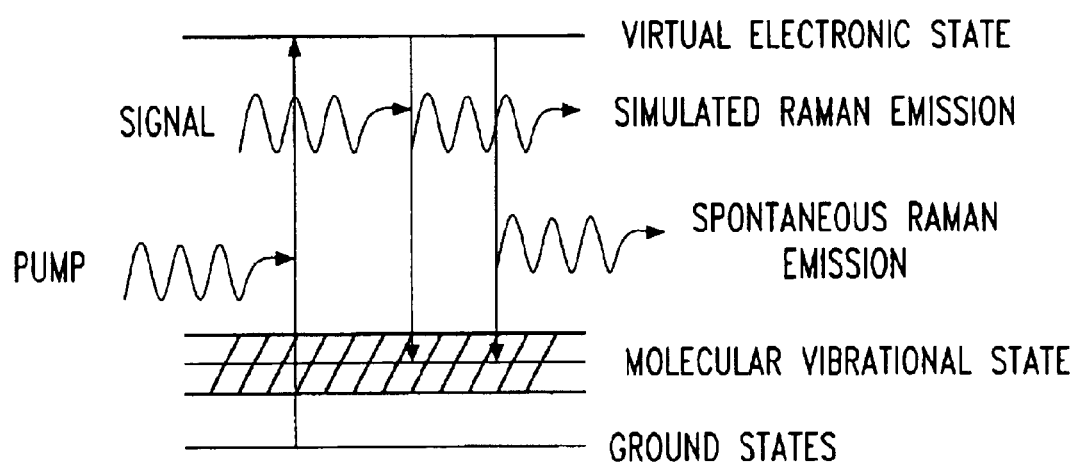
FIG. 1 is a prior art diagram showing energy levels and transition associated with stimulated and spontaneous Raman emission.
Figure 2A:
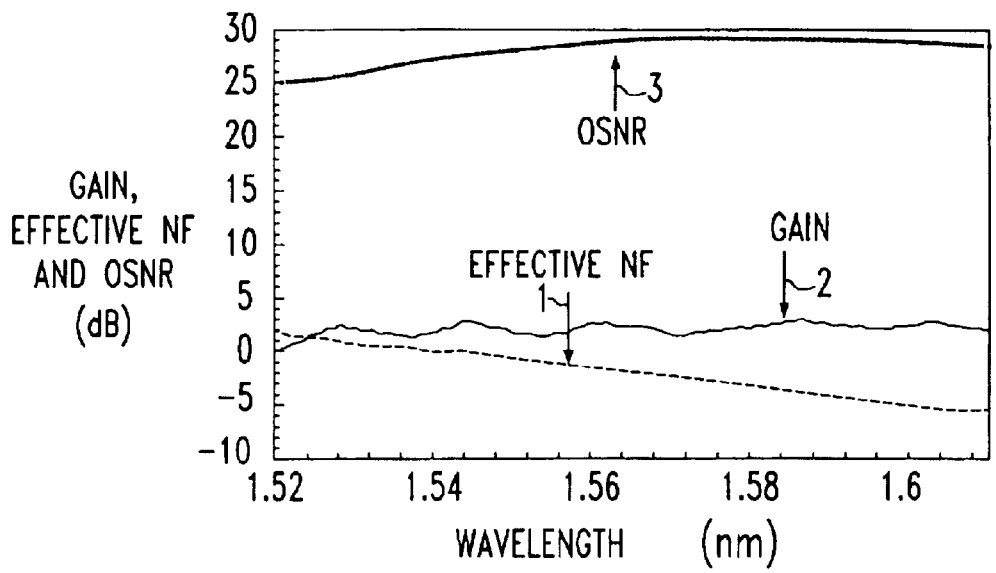
FIG. 2a is a prior art graph showing calculated gain, effective noise and optical signal-to-noise ratio for a five-wavelength Raman amplifier.
Figure 2B:
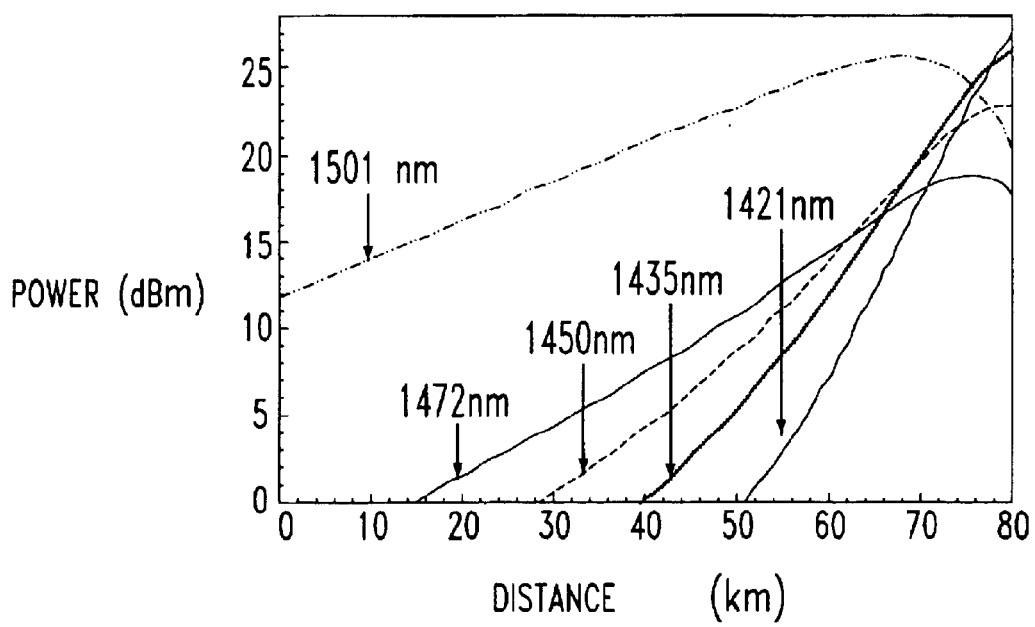
FIG. 2b is a prior art graph showing the averaged pump power along fiber length.
Figure 2C:
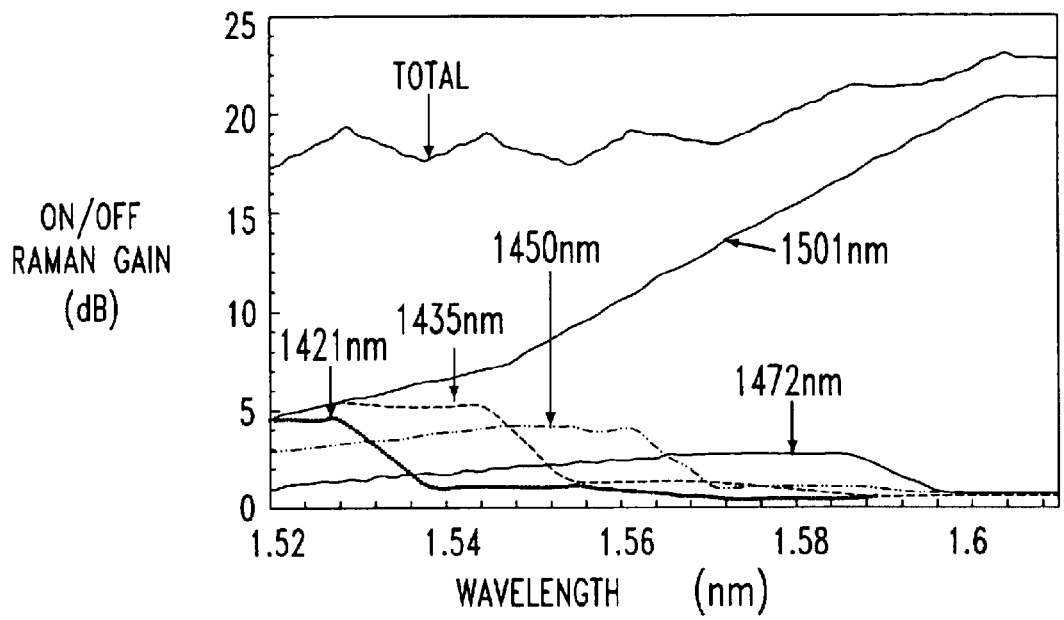
FIG. 2c is a prior art graph showing composite on/off gain spectrum.
Figure 3:
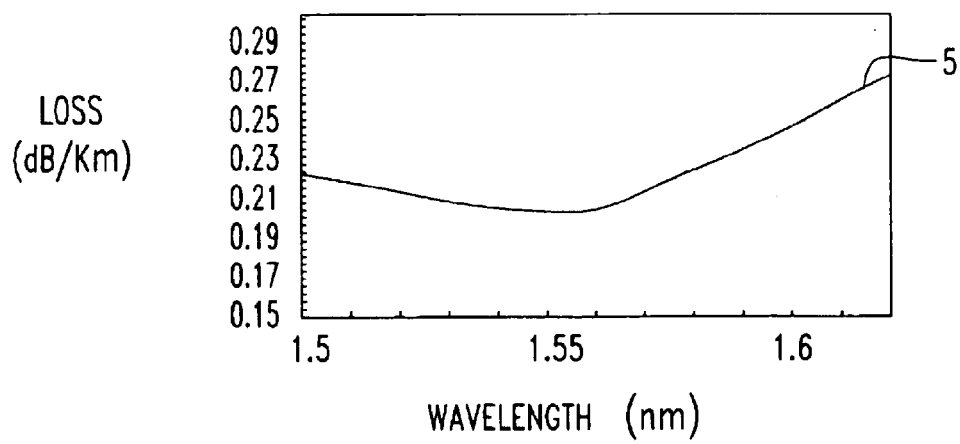
FIG. 3 is a prior art graph showing fiber loss versus wavelength.

When two-order pumping is introduced, the required input powers of the shorter-wavelength pumps can be significantly reduced for both schemes. In the case of modulation of one pump plus two-order Raman amplification, the gain given by the shorter-wavelength pumps—say, the shortest-wavelength pump—comes from two parts of time slots: one from the slot that doesn't overlap with the longest-wavelength pump (denoted as Part 1 hereafter) and the other from the part that overlaps with the longest-wavelength pump (denoted as Part 2 hereafter). Due to the smallness of the input pump power and also due to the rapid energy transfer between Part 2 and the longest-wavelength pump, the gain coming from Part 2 is much smaller than that coming from Part 1 (this is true for η=0.5 or less). As a result, the longitudinal gain profile given by this pump becomes comparable with the case of two-group TDM plus two-order pumping as is shown in FIG. 11b. On the other hand, in the case of two-group TDM plus two-order pumping, the required time-averaged input power of the longest-wavelength pump is higher than the case of one-pump modulation plus two-order pumping (to achieve an identical gain spectrum profile as is shown in FIG. 2a). As a result, the gain given by this pump is closer to the end of the fiber compared with the case of one-pump modulation plus two-order pumping.

Note that the scheme of modulation of one/multiple pumps plus multiple-order Raman amplification has higher pump power utilization and is also easier to implement compared with the scheme of two-group TDM plus multiple-order Raman amplification. In view of purely ASE noise suppression, modulation of one/multiple pumps plus multiple-order Raman amplification is usually a better choice. This is the case of conventional SSMF fiber, where the noise components originating from pump-pump induced FWM effects are negligible. However, in the case of NZ-DSF fiber, pump-pump induced FWM effects can degrade the noise performance in a considerable degree. This is due to the fact that this kind of fiber has relatively low dispersion in the range of conventional pump wavelength (1410–1510); therefore the FWM phase mismatch factor can be much smaller than the case of SSMF fiber. Pump-pump induced FWM products can be generated in such a manner: if there are three different pump frequencies, $f_i$, $f_j$ and $f_k$, the pump-pump induced non-degenerate FWM product will appear in the frequency $f_F$: $f_F = f_i + f_j - f_k$; if $f_i = f_j$ (i.e., there are only two pump wavelengths), the pump-pump induced degenerate FWM product occurs in the frequency of $2f_i - f_k$. If these FWM products fall into the signal region, they will degrade the noise performance of these signals.

In the case of NZ-DSF fiber, if the above-described group TDM scheme is chosen, both the ASE noise originating from spontaneous Raman scattering and the noise components originating from pump-pump induced FWM effects can be reduced. n pump lights with frequency of $f_{p1}$, $f_{p2}$ . . . , and $f_{pn}$ ($f_{p1} > f_{p2}$ . . . $> f_{pn}$) are necessary to provide the required flat gain spectrum. According to the principle of a two-group TDM scheme, the pump light sources can be divided into two groups, $f_{p1}$ . . . $f_{pm}$ and $f_{pm+1}$ . . . $f_{pn}$, in such a manner that $f_{p1} - f_{pm} < f_{pm} - f_{s1}$ and $f_{pm+1} - f_{pn} < f_{pn} - f_{s1}$, where $f_{s1}$ is the highest signal frequency (or the shortest signal wavelength). Because these two groups of pump lights don't overlap in the time domain during transmission (a small overlap due to group velocity dispersion is negligible for proper electrical modulation frequencies), the pump-pump induced FWM noise components (the first order) from the two groups are completely shifted to the lower side of the signal band without reduction of the number of the used pump lights.

Note that while only a two-group TDM scheme was discussed above, the pump lights can be divided into more groups. However, the pump power utilization will reduce significantly when the number of groups is increased. In fact, simulated investigations have shown that the additional noise performance improvement achieved by increasing the number of groups is not significant. Generally, two-group TDM is the preferred choice.

Referring now to FIG. 12, a block diagram showing the various methods of providing communities-of-interest across multiple services and across multiple service providers is shown. The rectangular elements are herein denoted "processing blocks" and may represent computer software instructions or groups of instructions.

Alternatively, the processing blocks represent steps which may be performed by functionally equivalent circuits such as a digital signal processor circuit or an application specific integrated circuit (ASIC). The flow diagram does not depict the syntax of any particular programming language. Rather, the flow diagram illustrates the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated, the steps described below are unordered, meaning that, when possible, the steps can be performed in any convenient or desirable order.

The method 400 begins at step 410 wherein a plurality of first-order pump lasers is provided. These lasers provide light at a wavelength that amplifies the signal present in the transmission fiber.

Step 420 modulates one or more pump lasers of the plurality of first-order pump lasers. When one pump laser is to be modulated, the longest wavelength laser of the group is the one that is modulated. The laser may be modulated at a predetermined duty cycle and/or frequency.

At step 430, a second-order pump may also be utilized. The second-order pump is provided at a wavelength that amplifies the light provided by the first-order pump lasers.

At step 440, time-domain multiplexing is performed. The first-order pumps are split into two groups, a shorter-wavelength group and a longer-wavelength group. The two groups are time domain multiplexed onto the fiber.

The signal noise performance in the shorter-wavelength side can be much worse than that in the longer-wavelength side in a multiple-wavelength counter-pumped fiber Raman amplifier. This is due to two facts: 1) the temperature-dependent spontaneous Raman emission is stronger when the signal is closer to the pump lights (this is the case of shorter-wavelength signals); and 2) the energy transfer is rapid from the shorter-wavelength pumps to the longer-wavelength pumps (therefore the shorter-wavelength signals will see a more lumped gain close to the fiber end than that seen by the longer-wavelength signals). In order to flatten the noise performance, the concept of one/multiple pump modulation was introduced. Simulations have shown that, for a multiple-wavelength counter-pumped wide-band Raman amplifier, the longest-wavelength pump plays a critical role: it gives not only most of the gain to the longer-wavelength signals, but also a considerable gain to the shorter-wavelength signals (comparable to that given by the shortest wavelength pump). By imposing a periodic intensity modulation to the longest-wavelength pump, the effective gain length of the shorter-wavelength pump is lengthened and therefore the noise performance in the shorter-wavelength signal band is improved. The noise performance improvement is strongly dependent on the duty cycle $\eta$ of the periodic intensity modulated pulse: the smaller $\eta$ is, the better the noise performance (in the shorter-wavelength signal band) becomes. More than one pump can be modulated, but the benefits from modulating more than one pump are minimal.

It is also shown that purely one multiple pump modulation will also degrade the noise performance in the longer-wavelength signal band. To further improve the noise performance in the shorter-wavelength signal band and also reduce the noise performance degradation in the longer-wavelength signal band, multiple-order Raman amplification was incorporated into the pump-modulation systems. It is shown that such a scheme performs much better than purely pump modulation or purely multiple-order Raman amplification. For example, by use of this scheme, the OSNR in the shorter-wavelength signal band can be improved about 3 dB with only 0.6 dB degradation in the longer-wavelength signal band (η=0.2) in a typical five-wavelength counter-pumped Raman fiber amplifier. This corresponds to a 2.0 dB additional OSNR improvement compared with purely one-pump modulation and a 1.9 dB additional OSNR improvement compared with purely two-order Raman amplification.

Modulating one/multiple pumps plus multiple-order Raman amplification is very suitable for SSMF fiber where pump-pump induced FWM effects are negligible. However, for NZ-DSF fiber, the pump-pump induced FWM effects can be serious due to close proximity to the dispersion zero. In order to suppress both ASE noise and pump-pump induced FWM effects, a group TDM scheme is presented. In this scheme, the pumps are divided into several groups. Each group is in-phase modulated and different groups are transmitted in different time slots. By proper pump grouping, the pump-pump induced FWM products (the first order) can be completely shifted to the lower side of the signal band. In terms of noise suppression, the purely two-group TDM scheme can perform better than the purely one-pump modulation. However, with the introduction of multiple-order Raman amplification, the two schemes exhibit nearly identical noise performance in the shorter-wavelength signal band. Note that the scheme of group TDM requires much higher pump powers than the case of one-pump modulation. Thus, for purely noise suppression, one-pump modulation plus multiple-order Raman amplification may be the preferred choice.

Table 3 gives a simulated performance comparison for various pump configurations, where η is chosen to be 0.5. In addition, eighty km of SSMF fiber and 2 W power for 1337 nm pump were used in the simulations.

TABLE 3

A performance comparison for various pump configurations
1R: 1-order pumping, mod1: one-pump modulation, SS: shorter wavelength signal,
LS: longer-wavelength signal.

| Pump Wavelength (nm) | 1337 | 1421 | 1435 | 1450 | 1472 | 1501 | OSNR (dB) SS 1520 | OSNR (dB) LS 1610 | FWM Suppress |
|---|---|---|---|---|---|---|---|---|---|
| CW + 1R |  | CW | CW | CW | CW | CW | 24.8 | 28.3 | No |
| CW + 2R | CW | CW | CW | CW | CW | CW | 25.9 | 29.4 | No |
| Mod1 + 1R |  | CW | CW | CW | CW | Mod | 25.5 | 27.5 | No |
| IN-Mod2 + 1R |  | CW | CW | CW | In-Phase mod | | 25.4 | 27.5 | No |
| Out-mod2 + 1R |  | CW | CW | CW | Out-Phase mod | | 25.4 | 27.4 | No |
| Mod1 + 2R | CW | CW | CW | CW | CW | Mod | 27.1 | 28 | No |
| TDM(4:1) + 1R |  | In-Phase mod | | | | Mod | 25.9 | 27.3 | Yes |
| TDM(3:2) + 1R |  | In-phase mod | | | In-phase mod | | 25.9 | 27.2 | Yes |
| TDM(4:1) + 1R | CW | In-Phase mod | | | | mod | 27.1 | 27.8 | Yes |
| TDM(3:2) + 2R | CW | In-phase mod | | | In-phase mod | | 27.2 | 27.9 | Yes |

Having described preferred embodiments of the invention, it will now become apparent to those of ordinary skill in the art that other embodiments incorporating these concepts may be used. Accordingly, it is submitted that the invention should not be limited to the described embodiments but rather should be limited only by the spirit and scope of the appended claims. All publications and references cited herein are expressly incorporated herein by reference in their entirety.

What is claimed is:

1. A multiple wavelength counter-pumped Raman amplifier comprising:

a plurality of first-order pump lasers, said plurality of first-order pump lasers providing light at respective wavelengths to amplify a signal in a fiber transmission line;

a modulator modulating a longest wavelength laser of said plurality of first-order pump lasers; and at least one second-order pump laser, said at least one second-order pump laser providing light at a wavelength to amplify the light provided by said plurality of first-order pump lasers.

2. The amplifier of claim 1 wherein said modulator modulates at a predetermined duty cycle.

3. The amplifier of claim 2 wherein said predetermined duty cycle is selected from the group including 0.8, 0.5 and 0.2.

4. The amplifier of claim 1 wherein said modulator modulates the longest wavelength laser of said plurality of lasers at a modulation period.

5. A multiple wavelength counter-pumped Raman amplifier comprising:

a plurality of first-order pump lasers, said plurality of first-order pump lasers providing light at respective wavelengths to amplify a signal in a fiber transmission line; and a modulator modulating a longest wavelength laser of said plurality of first-order pump lasers, wherein said modulator modulates the longest wavelength laser of said plurality of lasers at a modulation period, wherein said modulation period ($T_M$) is defined as $$T_M << \frac{L}{c_n}, \text{ and}$$

$$T_M >> \left(\frac{D_L + D_S}{2}\right) \cdot L \cdot (\lambda_{pn} - \lambda_{pl}) \cdot 10^{-12}$$

wherein L equals fiber length in km, $C_n$ is the velocity of light in the fiber, $D_L$ is the fiber dispersion at the longest wavelength $\lambda_{pn}$, and $D_S$ is the fiber dispersion at the shortest wavelength $\lambda_{p1}$.

6. The amplifier of claim 1, wherein said modulator further modulates at least one additional pump of said plurality of first-order pump lasers.

7. The amplifier of claim 1 wherein said second-order pump has a wavelength one Raman shift from a shortest wavelength pump of said first-order pump lasers.

8. The amplifier of claim 1 wherein the fiber is selected from the group including Standard Single-Mode Fiber (SSMF) and Non-Zero Dispersion-Shifted Fiber (NZ-DSF) fiber.

9. A multiple wavelength counter-pumped Raman amplifier comprising:
a plurality of first-order pump lasers, said plurality of first-order pump lasers providing light at respective wavelengths to amplify a signal in a fiber transmission line; and
a modulator modulating a longest wavelength laser of said plurality of first-order pump lasers,
wherein said plurality of first order pumps is split into a first grouping of pumps and a second grouping of pumps and wherein said first grouping of pumps is time domain multiplexed with said second grouping of pumps.

10. The amplifier of claim 9 wherein said first grouping of pumps comprises shorter-wavelength pumps and wherein said second grouping of pumps comprises longer-wavelength pumps.

11. The amplifier of claim 9 wherein said plurality of first-order pumps is split into more than two groups, and wherein each of said more than two groups are time domain multiplexed.

12. The amplifier of claim 1 further comprising:
a first multiplexer receiving light from each of said plurality of first-order pump lasers and providing an output; and
a second multiplexer receiving an output from said first multiplexer and light from a transmission fiber and providing an output on the transmission fiber.

13. A method of reducing noise in a broadband Raman amplifier comprising:
providing light at a wavelength to amplify a signal in a fiber transmission line with a plurality of first-order pump lasers;
modulating a longest wavelength laser of said plurality of first-order pump lasers; and
providing light at a wavelength to amplify the light provided by said plurality of first-order pump lasers with at least one second-order pump laser.

14. The method of claim 13 wherein said modulating is performed at a predetermined duty cycle.

15. The method of claim 14 wherein said predetermined duty cycle is selected from the group including 0.8, 0.5 and 0.2.

16. The method of claim 13 wherein said modulating is done at a modulation period.

17. A method of reducing noise in a broadband Raman amplifier comprising:
providing light at a wavelength to amplify a signal in a fiber transmission line with a plurality of first-order pump lasers; and
modulating a longest wavelength laser of said plurality of first-order pump lasers,
wherein said modulating is done at a modulation period, and
wherein said modulation period ($T_M$) is defined as $$T_M << \frac{L}{C_n}, \text{ and}$$

$$T_M >> \left(\frac{D_L + D_S}{2}\right) \cdot L \cdot (\lambda_{pn} - \lambda_{pl}) \cdot 10^{-12}$$

wherein L equals fiber length in km, $C_n$ is the velocity of light in the fiber, $D_L$ is the fiber dispersion at the longest wavelength $\lambda_{pn}$, and $D_S$ is the fiber dispersion at the shortest wavelength $\lambda_{p1}$.

18. The method of claim 14 wherein said modulating further comprises modulating at least one additional pump of said plurality of first-order pump lasers.

19. The method of claim 13 wherein said second-order pump laser has a wavelength one Raman shift from a shortest wavelength pump of said first-order pump lasers.

20. The method of claim 13 wherein the fiber is selected from the group including Standard Single-Mode Fiber (SSMF) and Non-Zero Dispersion-Shifted Fiber (NZ-DSF) fiber.

21. A method of reducing noise in a broadband Raman amplifier comprising:
providing light at a wavelength to amplify a signal in a fiber transmission line with a plurality of first-order sump lasers;
modulating a longest wavelength laser of said plurality of first-order pump lasers;
splitting said plurality of first order pumps into a first grouping of pumps and a second grouping of pumps; and
time domain multiplexing said first grouping of pumps with said second grouping of pumps.

22. The method of claim 21 wherein said splitting comprises splitting said plurality of first-order lasers into a first grouping of shorter-wavelength pumps and a second grouping of longer-wavelength pumps.

23. The method of claim 21 wherein said splitting comprises splitting the plurality of first-order pumps are split into more than two groups, and wherein said time domain multiplexing comprises time domain multiplexing each of said more than two groups.

* * * * *